United States Patent [19]

Covington

[11] Patent Number: 4,824,688

[45] Date of Patent: Apr. 25, 1989

[54] HYDROGEL LENS WITH A SIMULATED IRIS PORTION

[76] Inventor: William S. Covington, River Rd., West Cornwall, Conn. 06796

[21] Appl. No.: 891,600

[22] Filed: Aug. 1, 1986

Related U.S. Application Data

[63] Continuation-in-part of Ser. No. 865,105, May 20, 1986.

[51] Int. Cl.$^4$ ............................ B05D 5/06; A61F 9/00
[52] U.S. Cl. ........................................ 427/2; 427/43.1; 427/44; 427/54.1; 427/282; 427/164; 427/429
[58] Field of Search ................ 427/2, 164, 44, 54.1, 427/282, 429; 8/507; 118/264, 266

[56] References Cited

U.S. PATENT DOCUMENTS

| | | | |
|---|---|---|---|
| 3,357,395 | 12/1967 | Lorber | 118/266 |
| 4,198,465 | 4/1980 | Moore et al. | 427/164 |
| 4,252,421 | 2/1981 | Foley | 8/507 |
| 4,273,799 | 6/1981 | Kamanda et al. | 427/164 |
| 4,559,059 | 12/1985 | Su | 427/164 |
| 4,615,593 | 10/1966 | Neete | 8/507 |

*Primary Examiner*—Janyce Bell
*Attorney, Agent, or Firm*—Yahwak & Associates

[57] ABSTRACT

An opaque, colored, hydrogel forming material is applied by a novel apparatus to hydrated soft contact lenses and cured in situ so as to form a pattern simulating the human iris in a number of colors.

8 Claims, 1 Drawing Sheet

HYDROGEL LENS WITH A SIMULATED IRIS PORTION

This application is a continuation-in-part of my copending application Ser. No. 865,105, filed May 20, 1986.

The present invention relates to improvements in soft contact lenses made from hydrogels consisting essentially of water and cross-linked hydrophilic polymers. Since the first appearance of such hydrogel contact lenses, attempts were made to apply colorants to them in order to achieve iris simulation for cosmetic purposes. Transparent dyes were used for tinting and opaque pigments were incorporated into the lens body for iris simulation. It was found, however, that due to the disparity between the swelling of the hydrogel upon hydration, and the nonswelling character of the colorants, the geometry of the lens surfaces was affected and the optical performance of the lens was destroyed, thereby rendering such attempts futile.

Two major attempts made to correct this problem were made the the "father" of hydrogel contact lenses, Otto Wichterle. In his U.S. Pat. No. 3,679,504, he attempted lamination of an opaque colored layer between two transparent lenses bonded to one another. In this U.S. Pat. No. 3,557,261, he offered a method of producing such laminated, bonded soft lenses by centrifugal or rotational casting. Neither method was acceptable, however, for commercial applications.

Others have made attempts to provide for coloration of contact lenses. So, for example, in U.S. Pat. Nos. 4,468,229, 4,553,975, and 4,559,059 taught the use of reactive dyes to tint HEMA lenses. The dyes disclosed by SU react with the MEMA molecule on a molecule to molecule basis to provide a transparent tinting at the lenses. Foley in U.S. Pat. No. 4,252,421, taught how to make xerogel lens buttons with a pigmented core and unpigmented periphery from which lenses would be machined and subsequently hydrated.

It has now been found, as more clearly disclosed below, that fully hydrated soft contact lenses which contain polymerized hydroxyalkyl methacrylate forming a hydrophilic body can be imprinted with a compatible hydrophilic opaque ink which upon exposure to radiation, such as ultra violet radiation, reacts and polymerizes to form a stable, dimensionally compatible, opaque colored pattern. Thus, by the use of an appropriately designed template, an opaque colored iris pattern can be placed on the lens.

The inks of the present invention are produced by adding to a hydroxyalkyl methacrylate formulation, similar to that of the lens to be imprinted, a compatible solvent which allows for the polyermization of the ink into a swollen gel. Such solvents are well known in the art. A preferred solvent is glycerol, but many other organic solvents may be used provided they are acceptable swelling agents for the polymered hydroxyalkyl formulation. To this are added catalysts and/or photoinitiators, all of which are well known in the art. Acceptable photoinitiations are UV sensitive free radical initiators, which respond to UV energy in the 180 nm to 400 nm spectrum. It is preferable to use only the lipid-soluble photoinitiators. These include: benzoin ethers, e.g. benzoin methyl ether, benzoin ethyl ether, benzoin isopropyl ether, etc; dialkoxyacetophenones, e.g. 2,2-diethoxyacetophenone, 2,2-dimethoxy-2-acetophenone; hydroxy substituted acetophenones; benzophenone; substituted benzophenones, e.g. 4,4'-bis(diethylamino)-benzophenone, 4-phenylbenzophenone, etc; and ring closed benzophenones, e.g. 2-isoprppylthioxanthone, 2-chlorothioxanthone, etc. Many more are known in the art. It is also preferred to employ combinations of photoinitiators in order to take advantage of the broadest spectrum of UV energy available. Finley divided pigments and colorants are dispersed in the solvent containing material so as to form a uniform suspension. The choice of pigments and colorants is extensive and embraces both organic and inorganic material More specifically, any colorant may be used providing it is capable of forming permanent bonds with the hydroxyalkyl methacrylate polymer after the latter is hydrated; it is water insoluble, and it can be dispersed in the monomer/glycerol carrier. Colorants which meet these conditions are found both among the inorganic pigments and the organic pigments. Examples of inorganic pigments are titanium dioxide C.I. No. 77891, iron oxide C.I. No. 77419, cobalt C.I. No. 77352, chrome yellow C.I. No. 77603, chrome titanate C.I. No. 77320, ultramarine blue C.I. No. 7707, chrome aluminate C.I. No. 77346, chrome-cobalt alumina C.I. No. 77343. Examples of organic pigments are Phthalocyanine C.I. No. 74260, pigment green B C.I. No. 10006. Additionally, pigments can be made by dyeing polymerized HEMA particles as described in Example VII by employing organic dyes capable of bonding to the HEMA molecule. Examples of such dyes are: Reactive Yellow 15, Reactive Orange 78, Reactive Blue 19, Reactive Blue 4, Reactive Blue 21, Reactive Black 5. Numerous hues and shades may be prepared by combining two or more of the above-listed colorants.

The distinction between a dye and a pigment is crucial to the understanding of the present invention. The prior methods described above are in large part concerned with the application of dyes to contact lenses. Dyes, by their very nature, do not cause as much of a problem with uneven swelling of hydrogels as pigments do. Dyes also do not provide for a satisfactory opacity which is needed to simulate an iris on a hydrogel lens. To quote from *Coloring of Plastics* (M. Ahmed, Van Nostrand Reinhold Publishing, New York 1979, pg. 25), "Colorants are divided into two classes: dyes and pigments. Dyes are synthetic chemicals soluble in n=most solvents and in the medium which they color. They are characterized by good transparency. Pigments are intensely colored solids, soluble in most solvents. In contrast to dyes, pigments exhibit no affinity for the materials in which they are used. They produce color by existing as discreet particles in the medium, Pigments provide color but they also diffuse light; therefore, they impart translucent or opaque color to plastics. Dyes absorb certain wavelengths of light while scattering none. Thus, unlike pigments, they are transparent."

The existence of particles of pigment within a hydrogel matrix will cause uneven swelling due to the nonswelling nature of the pigment aggregates. The dye, on the other hand, since it is in solution, bonds or adsorbs to specific sites on the macromolecular chain, one molecule at a time, without forming nonswelling enclosures in the hydrated matrix. Therefore, any modification of the swelling characteristics of the dyed hydrogel is uniform. The inclusion of pigment particles in the polymeric matrix provides the opacity needed for iris simulation, but, at the same time, causes the problem of nonuniform swelling. This difficulty is overcome by the present invention.

In order to more fully understand the present invention, references will be made to the drawings in which.

Figures 1, 2, 3:
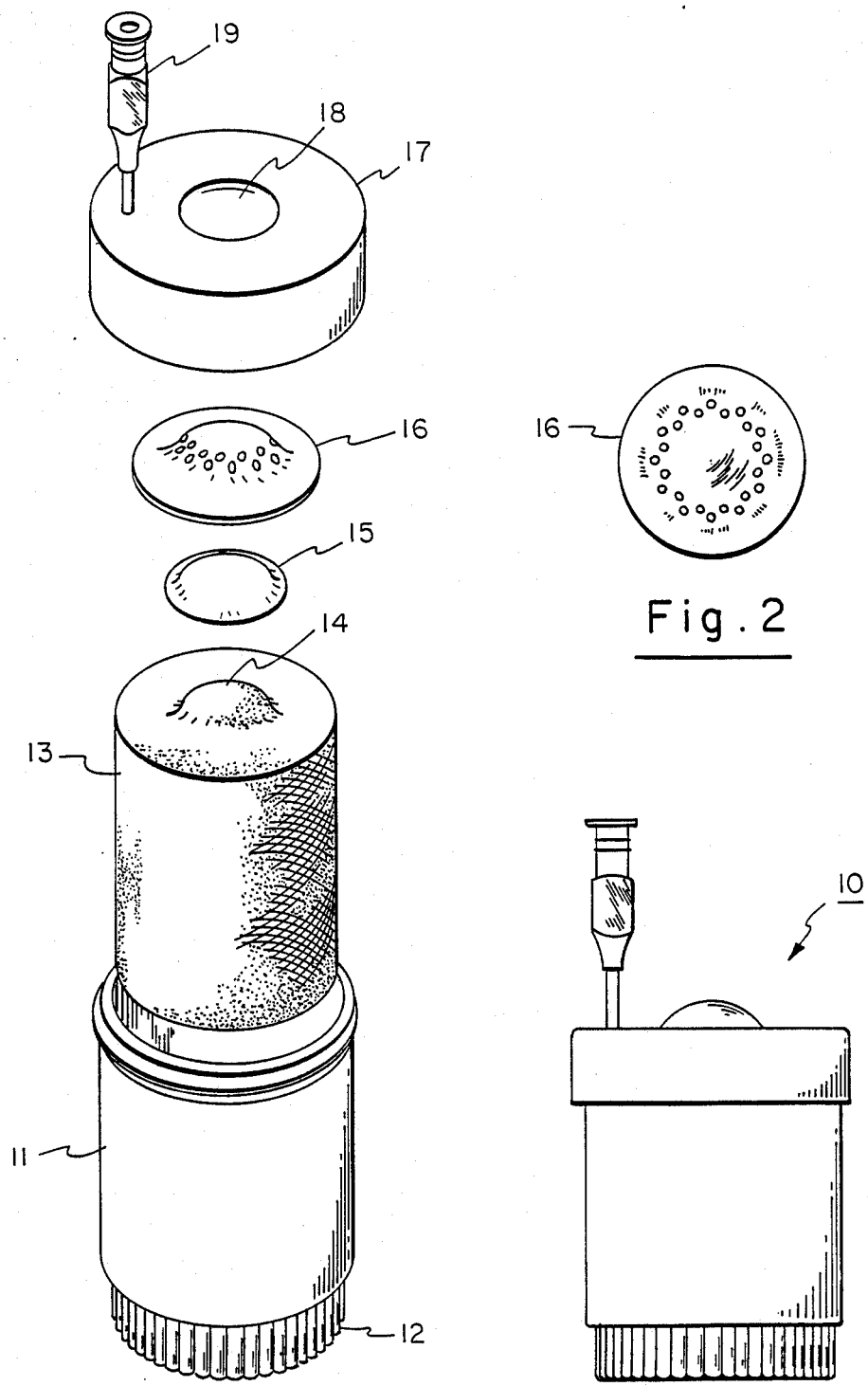
FIG. 1 is a linear exploded perspective view of the apparatus used to apply the compatible opaque ink to fully hydrated soft contact lenses.
FIG. 2 is an upper plan view of an iris template according to the present invention.
FIG. 3 is a side plan view of the apparatus of FIG. 1 in assembled form.

The assembled apparatus 10 which allows for the application of the polymerizable colorant of the present invention to a fully swollen hydrated contact lens surface consists generally of a cylindrical container 11, a deformable wick support 13, and an upper container cover 17. The container 11 preferably has means 12 (such as a ridged turnable base as shown) whereby an internal piston (not illustrated) may be raised or lowered within the interior of the container 11 to elevate the deformable wick support 13, and thereby maintain lens 15 hydrated and dimensionally stable during application and cure of the coloring imprint. The wick support 13 may be made of cotton, felt, sponge, or any other material which is deformable, water retentive, and chemically compatible with the hydrogel lens and colorant. The uppermost portion of the wick support 13 is shaped as a hemisphere 14 which corresponds to the curvature of the hydrated lens 15. If it is desired, a template or stencil 16 having patterned aperatures may be placed over the lens during application of the colorant to provide for the transfer of a design unto the iris portion of the lens. The stencil 16 may be manufactured from teflon or other material which allows for its easy release from the hydrogel after imprinting. The use of the stencil also allows the colorant to be applied to the lens surface by brushing, spraying, or other techniques, and also permits overprinting with other colorants to achieve desired cosmetic effects. The container cover 17 contains a central opening 18 of sufficient size to accommodate all but the peripheral margin of the hydrated lens 15. It is desirable that the container have means 19 which will allow the fluid, normally water, in the container to be replenished as evaporation occurs; although it is not required, such means would normally be carried in ocrer 17 as a matter of design and ease of use.

In use, a hydrogel lens 15 will be hydrated in distilled water, and when fully hydrated be placed on the hemipherical surface 14 of a moist wick support 13 (the wick support should be equilibrated with distilled water prior to placing the lens upon the hemispherical support). The exposed wick surface will remain constantly wet due to its selection for this use. A stencil 16 which is sized to be larger than the diameter of the hydrated lens 15 is placed over the lens, and cover 17 is firmly set over the open end of the container. Piston means 12 is then turned until the hemisphere, lens, and template are in tight fitting contact.

The polymerizable colorant described more fully in the following examples may then be applied to the fully hydrated lens in accordance with the teachings of the present invention. When, for example, the colorant of Example I was applied to the anterior surface of the lens with a brush and the surface then exposed to UV radiation, it was found after four minutes of exposure the integrity of the opaque colored areas remained intact.

EXAMPLE I

A mixture consisting of 100 grams of 2-hydroxyethylmethacrylate, 25 grams of N-vinyl pyrrolidone and 0.375 grams of ethyleneglycol dimethacrylate was prepared by putting said components in a beaker and stirring for 2 hours at 50 rpm. While stirring, 0.5% by weight of diethoxyacetophenone was added to the mixture. After the DEAP was dissolved, stirring was continued to insure a uniform solution. 125 grams of glycerol was added to the beaker and the mixture stirred until uniform. A glass mandrell was dipped in the mixture and exposed to UV from a medium pressure mercury lamp delivering 125 watts per inch of output. After 90 seconds the mandrell was found to be coated with a flexible transparent film. The coating was yellow in color; however, upon immersion in distilled water it became colorless. The water was found to contain glycerol, indicating that the plycerol in the gel had been replaced by water. 17.5 grams of finely divided chromium oxide green pigment, having a maximum particle size of 0.5 micron was added to the mixture and mixed thoroughly until a uniform dispersion was achieved. A glass mandrell was dipped in the mixture and exposed to UV radiation as above. A light green, opaque, flexible film was formed on the mandrell after a 3 minute exposure. Upon immersion in distilled water it remained intact, albeit lighter in hue. The water was found to be contaminated with glycerol as above.

EXAMPLE II

A hydrogel lens made of the identical formulation as the starting mixture in Example I, was hydrated in distilled water. When it was fully swollen, it was placed on a wet block consisting of hemispherically shaped cotton pad placed in a reservoir containing distilled water. The exposed pad surface remained constantly wet due to its acting like a wick. The lens was placed centrally on the pad in firm contact with the moist substrate. The ink of Example I was applied to the anterior surface of the lens with a brush and the surface was then exposed to UV radiation as in Example I. After 4 minutes of exposure it was removed and placed in a shallow beaker full of water. It was noticed that the integrity of the opaque colored areas remained intact. The lens was further exposed to the UV radiation in the water. The color turned slightly lighter and the water was contaminated with glycerol. The lens was removed form the beaker, washed repeatedly to remove all traces of glycerol and stored in physiological saline for autoclaving. After autoclaving at 110° C. the colored sectors remained intact.

EXAMPLE III

The procedure of Example II was repeated, except that the UV energy was delivered to the convex surface of the lens via a bundle of fiber optic light pipes, 24 inches in length. The exit surface of the fiber bundle delivered UV out without unwanted heat. The hydrogel lens, mounted on its wetblock was allowed to stand after the ink was applied for 25 minutes before being exposed to the UV energy. This allowed the monomers/glycerol mixture and the water held in the hydrated lens matrix to interpenetrate. After the process was completed, the lens was bisected and the cross-section examined under magnification. It was observed that no sharp interface between the lens surface and the pigmented material could be established.

Lenses made as per Example II were imprinted with different pigment formulation. All yielded unitary structures which, upon cross-sectioning as in Example III exhibited no sharply defined interface. The following illustrate the use of different pigments, photoinitiators and monomer/glycerol mixtures:

| EXAMPLE | MONOMER MIXTURE | PHOTO-INITIATOR | PIGMENT |
|---|---|---|---|
| IV | HEMA/EGDMA | DEAP/BP | CHROME YELLOW |
| V | HEMA/TEGDMA | ITX/DMAEB | ULTRA-MARINE BLUE |
| VI | HEMA/NVP/EGDMA | DEAP/BME | TITANIUM DIOXIDE |

In general, a mixture of photoinitiators is used to assure reaction by exposure to the broadest possible UV spectrum from 180 nanometer to 400 nanometers. Thus, the absorption of photoenergy by the colorant does not retard the photoinitiation of the polymerizing reaction. In the above examples the abbreviations are: HEMA=2-hydroxyethyl methacrylate, EGDMA=ethylene glycol dimethacrylate, TEGDMA=tetraethylene glycol dimethacrylate, NVP=N-vinyl pyrrolidone, DEAP=2,2 diethoxy acetophenone, BME=benzoin methyl ether, BP=benzophenone, ITX=2-isopropyl thioxanthone, DMAEB=2(dimethyl amino) ethyl benzoate.

It is evident that as long as the pigmentcarrying formulation s capable of interpenetrating the swollen hydrated lens and bonding to he polymerized HEMA in lens matrix, it need not be identical with the lens formula; it is sufficient that the pigmentcarrying formulation include an adequate proportion of hydroxyalkyl acrylate.

EXAMPLE VII

A mixture of monomers capable of polymerizing to form a hydrophilic polymer was prepared as described in Example I. Additionally 5 wt/% styrene was incorporated in the mixture. To this starting formulation was added Reactive Blue 5 at the rate of 0.1 wt/%. The mixture was polymerized into a solid xerogel of an intense blue color. The material was pulverized in a mill until it consisted of finely divided particles of one micron maximum size. This power was placed in water and allowed to swell to its maximum dimensions.

EXAMPLE VIII

The procedure of Example III was repeated, except that the pigment described in Example VII was substituted for the chromic oxide pigment. The resulting lens exhibited a pleasing light blue, opaque pattern.

EXAMPLE IX

The procedure of Example VIII was repeated with the exception that the pigment employed was made as per Example VII by using Reactive Yellow 15 and Reactive Black 5 to color the monomeric mixture. The resulting lens exhibited a light green pattern.

EXAMPLE X

A hydrogel lens was placed on the wet block described in Example II. The ink of Example I was modified by replacing the glycerol with 7.0 grams of tetraethyleneglycol dimethacrylate. The modified ink was applied to the hydrated lens and exposed to UV radiation as in Example I. The cured ink remained firmly attached to the lens surface after immersion in normal saline at boiling temperature.

EXAMPLE XI

Example X was repeated except that the ink was further modified by replacing 50 grams of 1-hydroxyethyl methacrylate with 25 grams of methyl methacrylate and 25 grams of butyl methacrylate. The imprint on the hydrogel lens surface proved stable and firmly attached to the lens surface.

The foregoing examples illustrate the wide range of variations and modifications which may be practiced within the scope of the invention. The choice of UV energy sources, UV photoinitiators, colorants and monomeric ink formulations is dictated by the overriding consideration that the colorant in its carrier matrix be applied to the hydrated lens in such a way that the lens and its imprinted iris form a single, unitary structure, and that the dimensional and optical parameters of the lens remain unaffected.

With regard to UV energy sources, these are well known in the art. Usually, medium pressure mercury lamps are used since they provide intense UV radiation in the 180 nm to 420 spectrum. Other sources such as xenon lamps, superactinic fluorescent lamps, low pressure mercury and high pressure mercury lamps. It is important, however, to isolate the irradiated surface from the intense heat of the UV source. This may be accomplished by conducting the UV energy from the source via a fiber optic light guide made of UV transmitting material. These are well known in the art and may be obtained from commercial sources.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

Thus, while I have illustrated and described the preferred embodiment of my invention, it is to be understood that this invention is capable of variation and modification, and I therefore do not wish to be limited to the precise terms set forth, but desire to avail myself of such changes and alterations which may be made for adapting the invention to various usages and conditions. Acccordingly, such changes and alterations are properly intended to be within the full range of equivalent, and therefore within the purview, of the following claims.

Having thus described my invention and the manner and process of making and using it, in such full, clear, concise, and exact terms so as to enable any person skilled in the art to which it pertains, or with which it is most nearly connected, to make and use the same.

I claim:

1. A method for providing a soft contact lens with a stable, dimensionally compatible, opaque color pattern which comprises imprinting said lens with an ink comprising an alkyl acrylic ester, an organic solvent which is a swelling agent for said lens and compatible with said ester, a photosensitive source of free radicals, and a finely divided pigment.

2. A method for providing a hydrated hydrogen contact lens with a stable dimensionally compatible opaque color pattern which comprises:

provdiing an apparatus which comprises a container having a reservoir portion and a cap portion, said cap portion having an opening of sufficient size to allow for the protrudence therethrough of the central portion of a contact lens, but not sufficient to equal the diameter of the contact lens, said container further having a deformable moistened wick support contained therein which is moistened with a fluid chemically compatible with a hydrogen contact lens and with a colorant to be added;

placing a hydrated hydrogel contact lens on said wick;

placing said cap portion over said reservoir portion so that the central portion of the lens protrudes through said cap portion;

imprinting said lens with a composition of matter comprising an alkyl acrylic ester, a solvent which is a swelling agent for said lens and compatible with said ester, a photosensitive source of free radicals, and a finely divided pigment or colorant; and causing the polymerization of the ester with the hydrated contact lens.

3. A method according to claim 2 in which the pigment is an organic pigment.

4. A method according to claim 2 in which the pigment is an inorganic pigment.

5. A method according to claim 2 in which the color pattern simulates the iris of the eye.

6. A method according to claim 2 in which the wick support is water retentive and chemically compatible with a hydrogel contact lens and with the colorant to be applied to the lens.

7. A method according to claim 2 in which the container further comprises:

a means to raise and lower an internal piston carried in said container; and means to allow fluid to be placed into said container.

8. A method for providing a soft contact lens with a stable, dimensionally compatible, opaque color pattern which comprises hydrating said lens to its hydrated state, imprinting said lens with a composition of matter comprising an alkyl acrylic ester and an opaque color pigment in admixture with an organic solvent which is a swelling agent for said lens and is compatible with said ester and which allows for the polymerization of the ester into the hydrated lens, and causing the polymerization of the ester with the hydrated contact lens.

* * * * *